United States Patent
Lontka

(10) Patent No.: US 8,280,070 B2
(45) Date of Patent: Oct. 2, 2012

(54) ARRANGEMENT AND METHOD FOR COMMUNICATING AUDIO AND DC SIGNALS

(75) Inventor: Karen D. Lontka, Randolph, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 651 days.

(21) Appl. No.: 12/541,509

(22) Filed: Aug. 14, 2009

(65) Prior Publication Data

US 2010/0111327 A1    May 6, 2010

Related U.S. Application Data

(60) Provisional application No. 61/090,350, filed on Aug. 20, 2008.

(51) Int. Cl.
*H04B 3/00* (2006.01)

(52) U.S. Cl. ........ 381/77; 381/80; 340/286.01; 340/288

(58) Field of Classification Search .................... 381/77, 381/79, 80, 81, 82, 120, 124; 340/286.01–286.05, 340/288, 310.11
See application file for complete search history.

(56) References Cited

U.S. PATENT DOCUMENTS

| 4,460,809 | A | * | 7/1984 | Bondar | 381/111 |
| 5,111,158 | A | * | 5/1992 | Malec et al. | 330/297 |
| 5,528,485 | A | * | 6/1996 | Devilbiss et al. | 363/89 |
| 5,701,353 | A | * | 12/1997 | Mamada | 381/106 |
| 7,321,262 | B2 | * | 1/2008 | Nielsen et al. | 330/10 |
| 8,159,361 | B2 | * | 4/2012 | Lontka | 340/636.1 |
| 2009/0322526 | A1 | * | 12/2009 | Lontka | 340/540 |

FOREIGN PATENT DOCUMENTS

EP    1538580 A1    6/2005
JP    2004094720 A    3/2004

* cited by examiner

*Primary Examiner* — Xu Mei

(57) ABSTRACT

An arrangement includes an input, a modulation circuit, an isolation circuit, a demodulator circuit, a detector circuit and at least two outputs. The input is configurable to receive an audio signal and a DC voltage. The modulation circuit is configured to modulate the audio signal and the DC voltage. The isolation circuit has an input electrically isolated from the output, wherein its input coupled to the modulation circuit. The demodulator circuit is operably coupled to the output of the isolation circuit and configured to extract the audio signal therefrom. The detector circuit is operably coupled to the output of the demodulator, and is configured to generate a first signal responsive to detection of a modulated signal corresponding to the DC voltage modulated by the modulation circuit.

13 Claims, 2 Drawing Sheets

ARRANGEMENT AND METHOD FOR COMMUNICATING AUDIO AND DC SIGNALS

This application claims the benefit of U.S. Provisional Patent Application Ser. No. 61/090,350, filed Aug. 20, 2008, which is incorporated herein by reference.

FIELD OF THE INVENTION

The present invention relates to circuits in building systems that provide signals to devices distributed at different areas of a building or facility.

BACKGROUND

Fire safety systems include, among other things, detection devices and notification devices. Detection devices include smoke, heat or gas detectors that identify a potentially unsafe condition in a building or other facility. Detection devices can also include manually operated pull stations. Notification devices, often referred to as notification appliances, include horns, strobes, and other devices that provide an audible and/or visible notification of an unsafe condition, such as a "fire alarm". Many fire control systems include loudspeaker devices that provide an audible signal generated at a source. The loudspeaker devices may be used to announce trouble, testing or other notifications to the inhabitants of a building.

In commercial, industrial, and multiple-unit residential buildings, fire safety systems can include one or more fire control panels that serve as distributed control elements. Each fire control panel may be connected to a plurality of distributed detection devices and/or a plurality of distributed notification appliances. In addition, other field panels or circuits operate to provide audio signals to at least one loudspeaker. As with other notification appliances, loudspeakers can distributed throughout an entire facility.

In a typical loudspeaker configuration, low voltage audio signals are provided to an amplifier within a field panel or field circuit. The amplifier transmits the audio signal to one or more loudspeakers via suitable wires. To allow for extended distribution without excessive loss, relatively high voltage audio signals are employed. For example, it is known to use 25 volt, 70 volt, and 100 volt audio signals in fire safety audio circuits. Relatively high voltage signals are less prone to I²R losses, and provide less sound degradation.

In large facilities, multiple distributed amplifiers provide audio signals to loudspeakers. Accordingly, the low voltage "source" audio signal must be conveyed to different amplifiers throughout the facility. Because the low voltage audio signal is subject to losses in long propagation paths, it is difficult to provide audio signal announcements throughout large systems with loudspeakers distributed over substantial areas in a building or campus.

One solution provided to this problem is to tap audio signals from the high voltage audio circuit that feeds the speakers. In this configuration, the high voltage audio circuit provides high voltage audio signals to loudspeakers, and then to a downstream circuit that receives the signal. The downstream circuit is a device that, for example, re-amplifies the signal to produce another high voltage audio signal for additional speakers. In this configuration, it is necessary to isolate the high voltage audio signals of the "source" circuit from the downstream circuit. Such isolation is required because conductors of significant length can be susceptible to unwanted common mode signals and noise. Such isolation is typically carried out using a transformer or capacitor coupling A drawback of the above-described solution is that it presents difficulties in providing continuity information and fault detection. In particular, it is known to use a DC voltage signal as a supervisory signal in various portions of a fire safety system to test for continuity. The supervisory signal is transmitted when an audio signal (or other alarm signal) is not being transmitted. Control circuitry detects aspects of the supervisory DC signal to determine if a short circuit or open circuit has occurred. In the above-described arrangement, the isolating transformer cannot pass the supervisory DC signal through to downstream circuits.

While downstream circuits can generate and analyze their own supervisory signals, there is not currently a way for information regarding upstream supervisory signals to be propagated.

SUMMARY OF THE INVENTION

The above described drawbacks by providing an isolation arrangement that employs modulation of the audio signal and the supervisory signal, when either is present, which can then be propagated through an isolation device to downstream circuits.

A first embodiment is an arrangement that includes an input, a modulation circuit, an isolation circuit, a demodulator circuit, a detector circuit and at least two outputs. The input is configurable to receive an audio signal and a DC voltage. The modulation circuit is configured to modulate the audio signal and the DC voltage. The isolation circuit has an input electrically isolated from the output, wherein its input coupled to the modulation circuit. The demodulator circuit is operably coupled to the output of the isolation circuit and configured to extract the audio signal therefrom. The detector circuit is operably coupled to the output of the demodulator, and is configured to generate a first signal responsive to detection of a modulated signal corresponding to the DC voltage modulated by the modulation circuit.

The above describe features and advantages, as well as others, will become more readily apparent to those of ordinary skill in the art by reference to the following detailed description and accompanying drawings.

DETAILED DESCRIPTION

Figure 1:
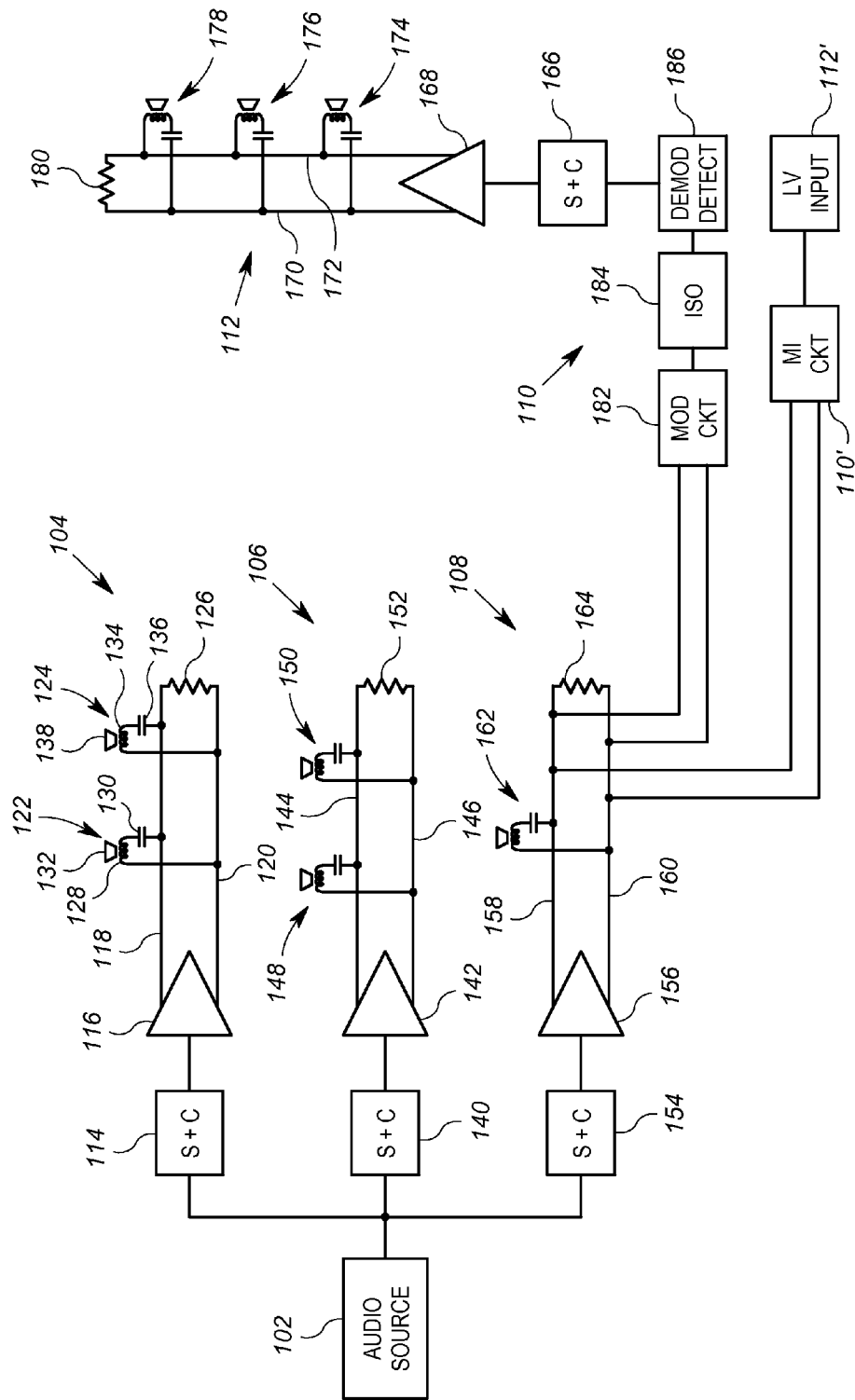
FIG. 1 shows a building audio signal notification system that incorporates an embodiment of the invention.

FIG. 1 shows a building audio signal notification system 100 that incorporates an embodiment of the invention. The notification system 100 includes an audio source 102, a first high voltage audio circuit 104, a second high voltage audio circuit 106, a third high voltage audio circuit 108, a modulation and isolation (MI) arrangement 110, and a fourth high voltage audio circuit 112. As also shown in FIG. 1, the notification system 100 further includes a second MI arrangement 110' coupled to a low voltage input audio signal notification input circuit 112'.

The audio source 102 may suitably be a circuit within a fire control panel that generates audio signals for propagation throughout the notification system 100. The audio signals are generally low voltage audio signals, in the range of 0.775

Vrms. Audio sources capable of generating such low voltage audio signals are well known in the art, and include the Live Voice Microphone or LVM system available from Siemens Building Technologies, Inc.

The first high voltage audio circuit 104 is a circuit configured to, among other things, generate relatively high voltage differential audio signals, and to convert the audio signals into audible sounds at different locations of the building. To this end, the audio circuit 104 includes a supervisory and conditioning (SC) circuit 114, an amplifier 116, two signal lines 118, 120, a first speaker arrangement 122, a second speaker arrangement 124, and an end-of-line resistor 126. The SC circuit 114 has an input operably connected to receive a low voltage audio signal from the audio source 102. The SC circuit 114 cooperates with the amplifier 116 to generate high voltage (25 Vrms, 70 Vrms or 100 Vrms) audio signals responsive to audio signals received from the SC circuit 114. The SC circuit 114 is also configured to cooperate with the amplifier 116 to produce a supervisory DC signal and to detect continuity aspects of the signals lines 118 and 120 based on measurements of the supervisory signal DC at the SC circuit 114. Such SC circuits are known, and include for example the audio input card (AIC) available from Siemens Building Technologies, Inc. The AIC card can be used with amplifier circuits in the model Zone Amplifer Module (ZAM) device or model Zone Amplifer Card (ZAM) also available from Siemens Building Technologies, Inc.

The first speaker arrangement 122 includes a speaker coil 128 and a series-connected DC blocking capacitor 130 coupled across the signal lines 118 and 120. The first speaker arrangement 122 further includes a cone assembly 132 that produces audible sound responsive to signals received by the coil 128. The speaker coil 128 and cone assembly 132 may by any suitable cone and coil assembly configured for reproduction of high voltage audio signals, such as public address loudspeakers and loudspeakers commonly used in fire safety systems. The second speaker arrangement 124 similarly includes a speaker coil 134, a series-connected DC blocking capacitor 136, and a cone assembly 138, coupled in the same manner as the first speaker arrangement 122.

The second high voltage audio circuit 106 is similar in construction and operation to the first high voltage audio circuit 104. Thus, the second high voltage audio circuit 106 is configured to, among other things, generate relatively high voltage differential audio signals and to converts the audio signals into audible sounds. Similar to the first high voltage audio circuit 104, the second high voltage audio circuit 106 includes a supervisory and conditioning (SC) circuit 140, an amplifier 142, two signal lines 144, 146, a first speaker arrangement 148, a second speaker arrangement 150, and an end-of-line resistor 152. The components of the second high voltage audio circuit 106 may suitably have the same or similar structure as the corresponding components in the first high voltage audio circuit 104.

The third high voltage audio circuit 108 is similar to the first and second high voltage audio circuits 104, 106 in structure and operation. Thus, the third high voltage audio circuit 108 includes a supervisory and conditioning (SC) circuit 154, an amplifier 156, two signal lines 158, 160, a first speaker arrangement 162, and an end-of-line resistor 164. The components of the third high voltage audio circuit 108 may suitably have the same or similar structure as the corresponding components in the first and/or second high voltage audio circuits 104, 106.

The fourth high voltage audio circuit 112 is similar to the other high voltage audio circuits 104, 106, 108 in structure and operation. Thus, the fourth high voltage audio circuit 112 includes a supervisory and conditioning (SC) circuit 166, an amplifier 168, two signal lines 170, 172, a first speaker arrangement 174, a second speaker arrangement 176, a third speaker arrangement 178, and an end-of-line resistor 180. The components of the fourth high voltage audio circuit 112 may suitably have the same or similar structure as the corresponding components in the first high voltage audio circuit 104. However, unlike the high voltage audio circuits 104, 106 and 108, the SC circuit 166 of the fourth high voltage audio circuit 112 is not coupled the audio source 102, but rather to one or more outputs of the MI arrangement 110, as will be discussed below in further detail.

It will be appreciated that the number of speaker arrangements (e.g. 124, 148, 162, etc.) in each of the high voltage audio circuits 104, 106, 108 and 112 are given by way of example only, and that each of the circuits 104, 106, 108 and 112 may have a number of speaker arrangements other than that shown in FIG. 1.

The MI arrangement 110 is a circuit that is configured to modulate a signal representative of a received audio signal and/or a supervisory DC signal, propagate the modulated signal over an isolation device, and demodulate the signal to obtain the audio signal and/or detect the supervisory DC voltage. To this end, the MI arrangement 110 has an input coupled to the signal lines 158 and 160 of the third high voltage audio circuit 108, and includes a modulation stage 182, an isolation stage 184 and a demodulation/detection stage 186. The modulation stage 182 includes a modulator that modulates, depending on the signal present, an audio signal or a supervisory DC voltage onto a carrier signal. The isolation stage 184 is a circuit that can propagate the modulated signal through an electrically isolated coupling, for example, an opto-isolator. The demodulation/detection stage 186 is a circuit that generates a demodulated audio signal or a detection signal indicative of the supervisory DC voltage, depending on the content of the modulated signal. The demodulation/detection stage 186 is configured to provide outputs indicative of the audio signal and/or supervisory DC voltage as one or more outputs. Such outputs are adapted to be received by an input circuit of another device that receives line level signals, or in other words, signals having significantly lower voltage levels than those present on lines 158, 160. In this embodiment, the demodulation/detection stage 186 is configured to provide such outputs to the SC circuit 166 of the fourth high voltage audio circuit 112.

The MI arrangement 110' may suitably be identical in structure and function to the MI arrangement 110 described above. Like the MI arrangement 110, the MI arrangement 110' has an input coupled to the signal lines 158 and 160 of the third high voltage audio circuit 108. The MI arrangement 110' is configured to modulate a signal representative of a received audio signal and/or a supervisory DC signal, propagate the modulated signal over an isolation device, and demodulate the signal to obtain the audio signal and/or detect the supervisory DC voltage. The MI arrangement 110' is operably coupled to provide the isolated and demodulated signal or signals to the low voltage input audio signal notification input circuit 112'. The low voltage audio signal notification input circuit 112' may suitably be an SC circuit of another high voltage audio circuit, or another building fire safety device that can use on or more of the outputs generated by the MI arrangement 110'.

In operation, a first steady state operation of the arrangement 100 is one in which no audio signals are present. In such a state, the SC circuit 114, 140, 154 and 168 generate supervisory tone signals, via their respective amplifiers 116, 142, 156 and 170 as is known in the art. In particular, referring to the first high voltage audio circuit 104 by way of example, the SC circuit 114 and amplifier 116 generate a supervisory DC voltage, for example, 24 volts. At least a part of the supervisory DC voltage is dropped across the end-of-line resistor 126, assuming normal continuity of the signal lines 118 and 120. The SC circuit 114/amplifier 116 detects the voltage drop and evaluates the voltage drop to determine whether the signal lines 118 and 120 have normal continuity. If there is a short circuit between the signal lines 118 and 120, then less-than-normal voltage difference will be detected. If there is an open circuit between the signal lines 118 and 120, then greater-than-normal voltage difference will be detected. This method is used to determine whether there is trouble with the equipment in the high voltage audio circuit 104.

Similar methods are employed in the other high voltage audio circuits 106, 108 and 112. However, in this embodiment, the supervisory DC signal from the high voltage audio circuit 108 is also propagated to the SC circuit 166 of the fourth high voltage audio circuit 112. This allows, among other things, the SC circuit 166 to monitor for continuity in the connection between the amplifier 156 of the third high voltage audio circuit 108 and the fourth high voltage audio circuit 112.

To this end, the supervisory DC voltage propagates from the signal lines 158, 160 to the modulation stage 182. The modulation stage 182 modulates the supervisory DC voltage onto a carrier signal. For example, the modulation stage 182 may use frequency modulation to modulate the carrier signal to a particular frequency that corresponds to the supervisory DC voltage. The modulated signal propagates through the isolation stage 184 such that the modulated signal is provided to the demodulation/detection stage 186 without electrical continuity between the modulation stage 182 and the demodulation/detection stage 186. The demodulation/detection stage 186 detects the presence of the supervisory DC signal that has been modulated onto the modulated signal, either by demodulation or even simple frequency detection. The demodulation/detection stage 186 provides an output indicating the detection of the supervisory DC signal to the circuit 166.

The SC circuit 166 receives the indication of the supervisory DC signal and may perform further actions based on this signal. For example, the SC circuit 166 may determine that the continuity from the circuit 108 is intact and cause the fourth high voltage audio circuit 112 to perform normal operations accordingly.

In another operation, the audio source 102 provides an audio signal to the SC circuits 114, 140, and 154. In such a case, the supervisory DC voltage is no longer produced by the SC circuits 114, 140, 154. The audio signal may be in the form of an announcement that is to be audibly broadcast to inhabitants of a building via the speaker arrangements 122, 124, 148, 150, 162, 174, 176 and 178. Alternatively, or in addition, audio signals may be used as control signals, if the SC circuits include voice activated circuits, which are known in the art.

When an audio signal is present, the SC circuit 114 and the amplifier 116 cooperate to amplify the audio signal to the high voltage level (e.g. 25, 70 or 100 volts rms). The amplified audio signal propagates to the speaker arrangements 122 and 124 via the signal lines 118, 120. The coils 128 and 134 cooperate with their respective cones 132 and 138 to provide an audible reproduction of the amplified audio signal. The SC circuits 140, 154 and amplifiers 142, 156 operate in a similar manner to cause their respective speaker arrangements 148, 150, and 162 to audibly reproduce the amplified audio signal.

In addition, the amplified audio signal on the lines 158 and 160 propagate to the modulation stage 182. The modulation stage 182 modulates the audio signals, and provides the modulated audio signals to the isolation stage 184. In addition, the modulation stage 182 preferably reduces the level of the audio signals from the high voltage used on the signal lines 158, 160.

The isolation stage 184 provides the modulated audio signals to the demodulation/detection stage 186 in a manner that is electrically isolated from the modulated stage 182. The demodulation/detection stage 186 demodulates the audio signals, and provides them as an output to the SC circuit 166. The demodulated audio signals are at a low voltage level, similar to that generated by the audio source 102.

The SC circuit 166 and amplifier circuit 168 then provide amplified versions of the received audio signal to the speaker arrangements 174, 176, and 178. As a result, the speaker arrangements 174, 176 and 178 reproduce substantially the same audio signal as that produced by the speaker arrangements 122, 124, 148, 150 and 162.

The notification circuit 100 provides an advantage that the distance between the circuit 108 and the circuit 112 can be relatively substantial, because of the high voltage used on the lines 158, 160. The high voltage allows for longer propagation of the signals while maintaining an acceptable signal to noise ratio. In addition, the isolation provided by the isolation stage 184 provides necessary protection to the circuits 108 and 112 from unwanted common mode signals and noise that can occur in multiple, long-run conductors. The use of modulation in connection with the isolation allows for propagation of the supervisory DC signal from the circuit 108 and 112, which provides for greater information in the SC circuit 166 regarding the operation (e.g. continuity) status of the notification circuit 100.

As shown in FIG. 1, the notification circuit 100 may employ multiple MI circuits (e.g. MI circuit 110, 110') on each high voltage audio circuit's signal lines. Accordingly, propagation of audio signals can be achieved in large buildings or campus environments, without coordination among several audio sources.

Figure 2:
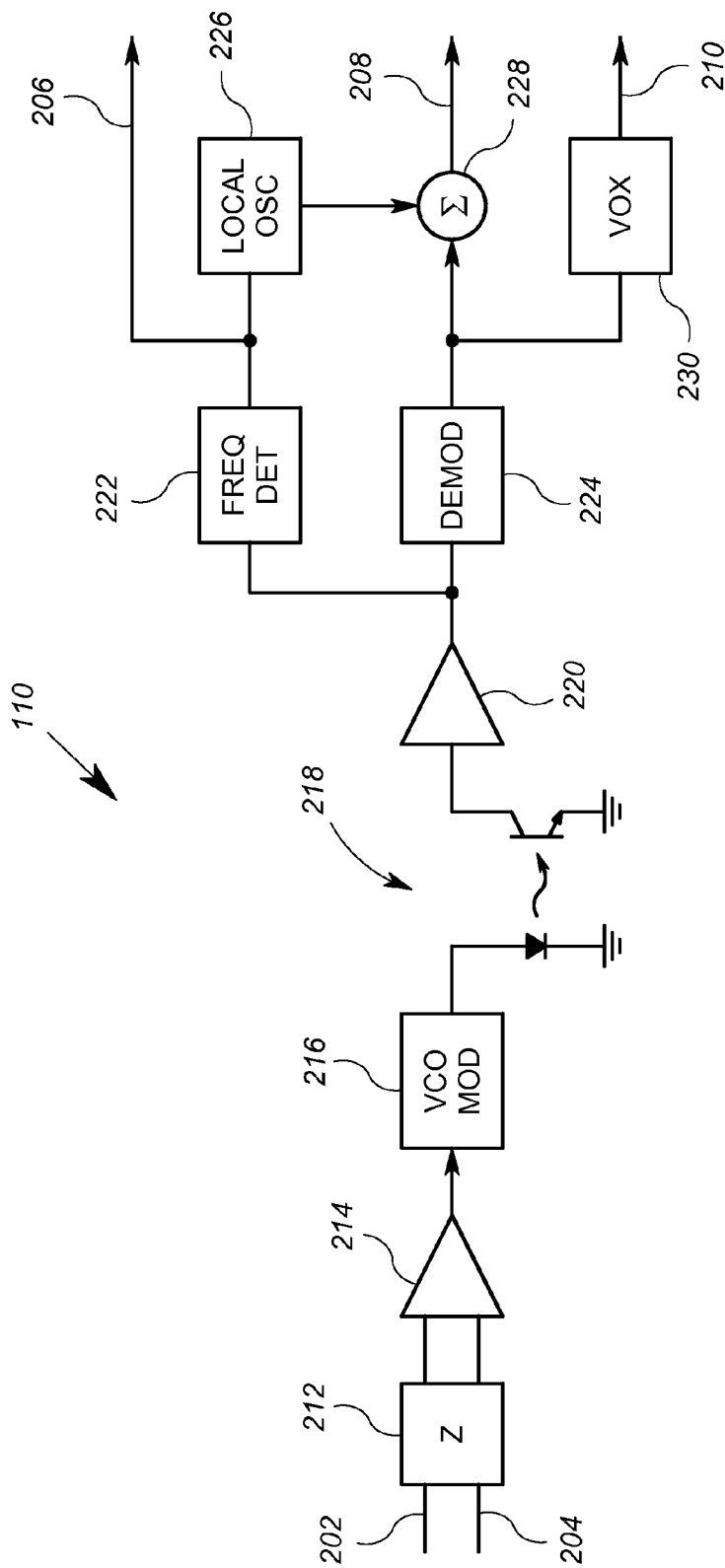
FIG. 2 shows a schematic block diagram of an exemplary embodiment of a modulation and isolation arrangement that may be used in the building audio signal notification system of FIG. 1.

FIG. 2 shows in further detail an exemplary embodiment of the MI circuit 110. The MI circuit 110 includes inputs 202, 204 which are configured to be coupled to a differential high voltage audio line, such as the signal lines 158, 160 of FIG. 1. The MI circuit 110 includes a set of three outputs 206, 208 and 210. The output 206 provides a logic DC signal indicative of the present or absence of a supervisory DC signal across the differential inputs 202, 204. The output 208 provides an audio signal which can be, in the case of the presence of an audio signal at the differential inputs, a reproduction of the audio signal. Alternatively, the output 208 provides a tone indicating the presence of a supervisory DC signal across the differential inputs 202, 204. The output 210 can provide a logic output responsive to detection of an audio signal present across the differential inputs 202, 204.

Some or all of the output signals at the outputs 206, 208 and 210 can be used by various circuits to propagate audio signals, control information, and continuity information to downstream devices and circuits.

As shown in FIG. 2, the differential inputs 202, 204 are connected through a high impedance circuit 212 to a differential amplifier 214. The output of the differential amplifier 214 is connected to a voltage controlled-oscillator (VCO) modulation circuit 216. The output of the VCO modulation circuit 216 is connected to an isolation circuit 218. The isolation circuit 218 in this embodiment is an optical isolator, but may take other forms. The output of the isolation circuit 218 is coupled to a signal buffer 220. The output of the signal buffer 220 is connected to a frequency detector 222 and a demodulation circuit 224.

The frequency detector 222, which may suitably be a band pass filter, is configured to detect a frequency that corresponds to the supervisory DC voltage modulated on to the carrier signal by the modulator 216. Thus, the frequency detector 222 is configured to generate an output signal that is indicative of whether a supervisory DC signal has been modulated onto the carrier signal by the VCO modulation circuit 216. The frequency detector 222 is operably connected to provide this output signal to the output 206 and a local oscillator 226. The local oscillator 226 may also be a voltage controlled oscillator, or an oscillator that can be turned on and off based on the output signal from the frequency detector 222. In either event, the local oscillator 226 is configured to generate a tone within a predetermined frequency range if the frequency detector 222 detects the presence of the supervisory DC voltage on the modulated signal. The output of the local oscillator 226 is provided to a summation device 228, which is discussed further below.

The demodulator 224 is a demodulation device configured to demodulate signals modulated by the VCO modulator 216. In this embodiment, the demodulator 224 is an FM demodulator. The output of the demodulator 224 is connected to the summation device 228 and a voice-controlled switch 230. The summation device 228 is configured to sum the output signals from the local oscillator 226 and the demodulator 224. In general, the local oscillator 226 does not generate a tone at the same time that the demodulator 224 provides audio signals because the signal at the input 202, 204 will either include the supervisory DC voltage or audio signals, but not both. Thus, the summation device 228 generally provides either the tone generated by the local oscillator 226, or audio signals demodulated by the demodulator 224, to the output 208.

The voice-controlled switch 230 is a device that can generate an output based on voice signals. Such devices are known in the art. The voice-controlled switch 230 is configured to generate an logic (DC) output responsive to specific audio signals received from the demodulator 224. Such a switch can be use for commanding the SC circuit 116 to activate the amplifier 168.

In operation, the differential inputs 202 or 204 will receive either audio signals, or a supervisory DC signal. In the case of equipment failure or trouble, the differential inputs 202 may receive neither signal. However, under normal operation, the differential inputs 202 or 204 will receive the supervisory DC signal (no trouble, test or notification), or an audio signal (indicating trouble, testing, or other notification to the building occupants).

In the event of receiving an audio signal, the differential inputs 202, 204 receive a high voltage audio signal, on the order of 25, 70 or 100 volts, depending on the configuration of the system. The attenuator 212 attenuates the differential signal such that is at a voltage that is within the input range of the differential amplifier 214. Thus, the differential signal may be less than 1 volt rms, or even up to 3 volts rms if the supply voltage to the differential amplifier 214 is approximately 15 volts. The differential amplifier 214 further conditions the audio signal and generates an output in which the differential audio signal has been converted to an audio signal referenced to a constant voltage reference. The VCO modulator 216 receives the audio signal from the differential amplifier 214 and modulates the audio signal onto a carrier frequency. The VCO modulator 216 thus provides a frequency-modulated (FM) audio signal to the isolation circuit 218. The isolation circuit 218 provides an isolated version of the FM audio signal to the frequency detector 222 and the demodulator 224.

The frequency detector 222 does not generate an output because it does not detect the frequency that corresponds to the supervisory DC signal in the FM audio signal. Thus, the local oscillator 226 does not generate any tone, and the output 206 provides a signal indicative that no supervisory DC signal was detected.

In the meantime, the demodulator 224 receives the FM audio signal and demodulates the signal to reproduce the audio signal substantially representative of the audio signal received at the differential inputs 202, 204. The demodulator 224 provides the audio signal to the summation device 228 and the voice-controlled switch 230. The summation device 228 provides the audio signal at the output 208. The voice-controlled switch 230 provides an output based on the audio content of the audio signal. In many cases, the voice-controlled switch 230 merely provides an indication that any audio signal is present.

In the event of receiving a supervisory DC voltage instead of an audio signal, the differential inputs 202, 204 receive a DC signal, which may suitably be on the order of 3 to 12 volts, depending on the configuration of the system. The attenuator 212 attenuates the differential signal such that is at a voltage of less than 1 volt DC. The voltage generated by the attenuator 212 responsive to a valid supervisory DC voltage will be a specific predetermined DC voltage. The differential amplifier 214 further conditions the signal and generates an output in which the differential DC signal has been converted to a DC signal referenced to a constant voltage reference. The VCO modulator 216 receives the DC signal from the differential amplifier 214 and modulates the DC signal onto a carrier frequency. The VCO modulator 216 thus provides a single frequency signal, which represents the carrier frequency shifted by the amount of the DC signal. The isolation circuit 218 provides an isolated version of the single frequency signal to the frequency detector 222 and the demodulator 224.

Because the single frequency signal represents (under normal circumstances) the supervisory DC signal modulated onto the carrier signal, the frequency detector 222 detects the single frequency and produces an output indicative of the presence of the supervisory DC signal. The frequency detector 222 through its output causes the local oscillator 226 to generate an output tone, and further provides a signal to the output 206 that indicates that a supervisory DC signal has been detected.

In the meantime, the demodulator 224 receives the single frequency signal and demodulates the signal to reproduce a DC signal. The DC signal has no audio content. Accordingly, the summation device 228 only provides the tone generated by the local oscillator 226 to the output 208. In addition, the voice-controlled switch 230 provides an output based on the lack of any audio content of in the DC signal.

Thus, the exemplary MI circuit 110 of FIG. 2 provides multiple outputs that can be useful for various downstream circuits, particularly in a fire safety audio broadcasting system. As discussed above in connection with FIG. 1, the outputs can be used by a SC circuit to further propagate the audio signals, and to further propagate supervisory DC signals to detect upstream circuit trouble. Examples of circuits that can use the outputs of the MI circuit 110 of FIG. 2 include the model AIC audio input circuit, available from Siemens Building Technologies, Inc., which has audio input terminals that may be connected to the output 208, and a control input terminal that may be connected to output 210. It will be appreciated that the outputs 206, 208 and 210 may be changed or configured to suit the needs of any downstream audio notification system device that can use audio signals, control signals triggered by audio signals, or supervision signals.

It will be appreciated that the above-described embodiments are merely exemplary, and that those of ordinary skill in the art may readily devise their own implementations and modifications that incorporate the principles of the present invention and fall within the spirit and scope thereof.

For example, as discussed further above, the MI circuit 110 may use other forms of modulation, such as pulse-width modulation or modulation via an A/D converter. Methods for demodulating such signals, and for detecting a single DC voltage modulated by such methods, would be known to those of ordinary skill in the art.

I claim:

1. An arrangement, comprising:
   a) an input configurable to receive an audio signal and a DC voltage;
   b) a modulation circuit configured to modulate the audio signal and the DC voltage;
   c) an isolation circuit having an input electrically isolated from an output; the input of the isolation circuit coupled to the modulation circuit;
   d) a demodulator circuit operably coupled to the output of the isolation circuit and configured to extract a second audio signal therefrom;
   e) a detector circuit operably coupled to the output, the detector circuit configured to generate a first signal responsive to detection of a modulated signal corresponding to the DC voltage modulated by the modulation circuit;
   f) at least a first audio output coupled to the demodulator circuit; and
   g) at least a first signal output coupled to the frequency detector circuit.

2. The arrangement of claim 1, further comprising a local oscillator coupled to the first signal output, the local oscillator configured to generate a tone signal responsive to the first signal.

3. The arrangement of claim 2, further comprising a summation device coupled to the first audio output and the local oscillator.

4. The arrangement of claim 3, further comprising a voice-controlled switch coupled between the demodulator circuit and the summation circuit.

5. The arrangement of claim 3, further comprising a voice-controlled switch coupled between the demodulator circuit and the summation circuit.

6. The arrangement of claim 1, wherein the modulation circuit comprises a frequency modulation circuit.

7. The arrangement of claim 6, wherein the detector circuit includes a band pass filter having a predetermined pass band.

8. The arrangement of claim 1, wherein the isolation circuit comprises an opto-isolator.

9. The arrangement of claim 1, further comprising an attenuator coupled between the input and the modulation circuit, the attenuator configured to attenuate input signals by at least an order of magnitude.

10. The arrangement of claim 1, wherein the second audio signal has a magnitude that is an order of magnitude less than a magnitude of the audio signal.

11. A method, comprising:
    a) receiving at different times, audio signals and DC voltages at an input;
    b) modulating the audio signals and the DC voltages;
    c) generating an electrically isolated version of the modulated audio signals and modulated DC voltages;
    d) demodulating the isolated version of the modulated audio signals;
    e) detecting a modulated DC voltage in the isolated version of the modulated DC voltages.

12. The method of claim 11, wherein step c), further comprising using a opto-isolator to generate the electrically isolated version of the modulated audio signals and DC voltages.

13. The method of claim 11, wherein step b) comprises frequency modulating the audio signals and DC voltages.

* * * * *